United States Patent [19]
Strachan

[11] Patent Number: 4,689,614
[45] Date of Patent: Aug. 25, 1987

[54] TOUCH SENSITIVE CATHODE RAY TUBE

[75] Inventor: John S. Strachan, Edinburgh, Scotland

[73] Assignee: Synrinx Innovations Limited, Edinburgh, Scotland

[21] Appl. No.: 810,329

[22] PCT Filed: Apr. 1, 1985

[86] PCT No.: PCT/GB85/00132
§ 371 Date: Dec. 4, 1985
§ 102(e) Date: Dec. 4, 1985

[87] PCT Pub. No.: WO85/04740
PCT Pub. Date: Oct. 24, 1985

[30] Foreign Application Priority Data
Apr. 4, 1984 [GB] United Kingdom ............... 8408658

[51] Int. Cl.[4] .............................................. G09G 3/00
[52] U.S. Cl. .................................. 340/706; 340/707; 340/712
[58] Field of Search ............... 340/365 C, 365 A, 712, 340/706, 707; 315/4, 13.11, 84.51; 250/213 VT

[56] References Cited

U.S. PATENT DOCUMENTS
4,230,967 10/1980 Holz et al. ...................... 340/365 C
4,567,480 1/1986 Blanchard ......................... 340/712

FOREIGN PATENT DOCUMENTS
2026745 2/1980 United Kingdom ............... 340/712

Primary Examiner—Marshall M. Curtis
Assistant Examiner—Mahmoud Fatahi-Yar
Attorney, Agent, or Firm—Murray and Whisenhunt

[57] ABSTRACT

A cathode ray tube provided on the exterior of its screen with a layer of polymeric piezoelectric material, for example polyvinylidene fluoride. Localized changes in physical stress on the layer, such as by way of localized pressure of heating on the layer, create a charge region which produces alteration of a beam current of an electron beam when the beam scans over the region. This alteration is detected, as by a sensing loop, to produce a data input.

5 Claims, 1 Drawing Figure

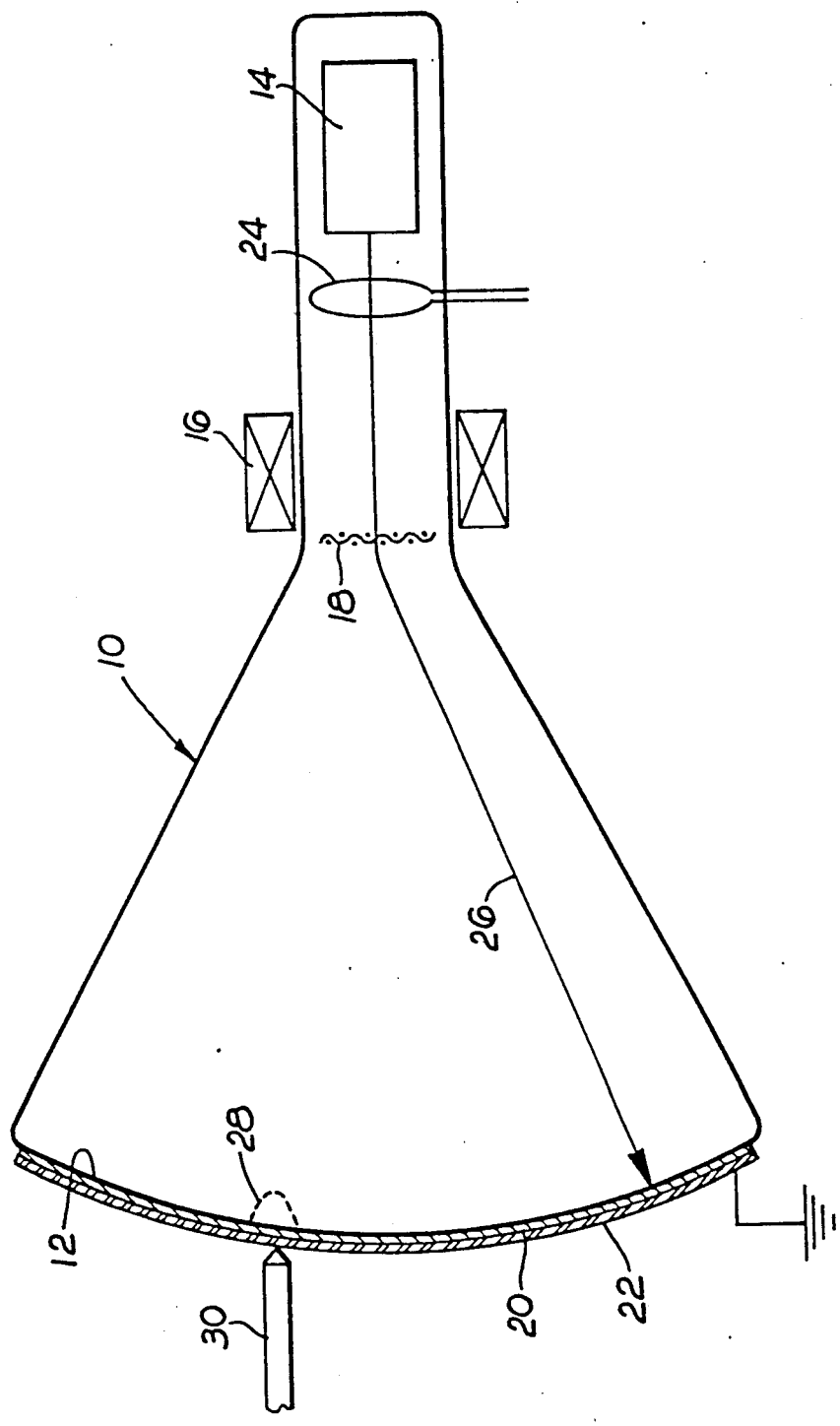

TOUCH SENSITIVE CATHODE RAY TUBE

BACKGROUND OF THE INVENTION

1. Field of the Invention

This invention relates to a cathode ray tube (crt) having a faceplate which is sensitive to pressure such that a user may communicate input information by touching the faceplate.

2. Description of Related Art

There are known means for communicating information to computers and the like in an interactive manner in association with a crt display. The commonest is the well-known "light pen" arrangement in which light controlled by the user interacts with layers deposited on the crt screen. Such systems are relatively complex and expensive, and require specially adapted crt's. It has also been proposed to make use of photosensitive devices adjacent the display which can be covered by a finger to act as an input, but these are of limited usefulness.

An object of the present invention is to overcome or mitigate the above disadvantages.

SUMMARY OF THE INVENTION

The invention accordingly provides a cathode ray tube in which a transparent layer is applied to the exterior of the screen, said layer being of a polymeric piezoelectric material whereby pressure or temperature change thereon creates a localised electric charge at that area of the screen; and including means for monitoring the beam current of the electron beam to detect when the electron beam scans over a said area of localised electric charge.

Preferably, said layer is of polyvinylidene fluoride (PVDF). A suitable form of this material is sold as KYNAR (Trade Mark) film by Pennwalt Corporation, King of Prussia, Pa. 19406, USA.

Preferably also, said layer is coated with a transparent conductive layer connected to earth (ground).

BRIEF DESCRIPTION OF THE DRAWING

An embodiment of the invention will now be described, by way of example only, with reference to the drawing, which is a schematic cross-sectional side view of a crt incorporating the invention.

DESCRIPTION OF PREFERRED EMBODIMENT

The tube has a glass envelope 10 including a screen 12 coated on its interior with the usual phosphors (not shown). The tube also has any suitable electron gun 14, deflection system 16 and control grid 18, all as well known per se. The tube however differs from the conventional in that the usual internal aluminised ground plane is omitted.

The outer surface of the screen 12 is covered with a layer 20 of PVDF. Suitably, the PVDF layer 20 is adhered to the screen 12 by a non-conductive contact adhesive. The PVDF layer 20 is itself coated with a transparent conductive layer 22 which is earthed. The layers 20, 22 are of course shown greatly exaggerated in thickness in the drawing. Means, such as a current sensing loop 24, are provided for monitoring the current of the electron beam at any instant.

If pressure is applied locally to the PVDF layer 20, e.g. by a stylus as shown at 30, a localised positive charge is created as indicated at 28 due to its piezoelectric characterisics. When the beam 26 is next scanned into the area of charge 28, the beam current drops relatively sharply and distinctly, producing a corresponding output form the sensing loop 24. This output can be used by suitable circuitry (not shown) to identify the position of the pressure point on the screen, for example by timing the interval from conventional raster scan frame and line sync signals to the occurrence of the output.

It will be appreciated that the electron beam discharges the positive charge as it scans over it. However, the PVDF layer 20 has the characteristic that, on release of the pressure, a negative charge will be created. Thus the input can be regarded as being "on" from the occurrence of the initial drop in beam current until the occurrence of a surge in beam current due to scanning the negative charge produced by release of the pressure.

The earthed conductive outer layer 22 is preferably present to prevent spurious inputs caused by static electricity building up on the screen. The layer 22 could for example be of indium tin oxide, copper or gold and could be applied by vapour deposition. The layer 22 is likely to be worn away by use; it is therefore preferable that the layers 20,22 can be removed and replaced, for example by using a soluble adhesive.

The voltage induced in the PVDF material is proportional to stress. Thus it may be preferable to use a pointed stylus. However, it is anticipated that direct pressure with the user's finger would be suitable for some applications. PVDF is also thermoelectric: the localised charge areas could be produced by "pointing" with a light beam, preferably one with a significant infrared content and focussed.

The invention could be applied for instance in selecting from a menu displayed on the screen, or in creating or amending graphics in computer-aided design.

I claim:

1. A cathode ray tube comprising:
   a screen having an exterior surface;
   a transparent layer on said exterior surface, said layer being of polymeric piezoelectric material having the characteric of generating a localized charge at an area of said screen in response to localized changes in physical stress applied to said layer;
   detecting means for monitoring a beam current of an electron beam traveling along a beam path, to detect when said electron beam scans over a said area of localized charge.
2. A cathode ray tube according to claim 1, in which said layer is of polyvinylidene fluoride.
3. A cathode ray tube according to claim 1, in which said layer is coated with a transparent conductive layer connected to ground.
4. A cathode ray tube according to claim 2, in which said layer is coated with a transparent conductive layer connected to ground.
5. A cathode ray tube according to claims 1, 2, 3, or 4, in which said detecting means comprises a current sensing loop disposed around said electron beam path.

* * * * *